United States Patent Office 2,705,132
Patented Mar. 29, 1955

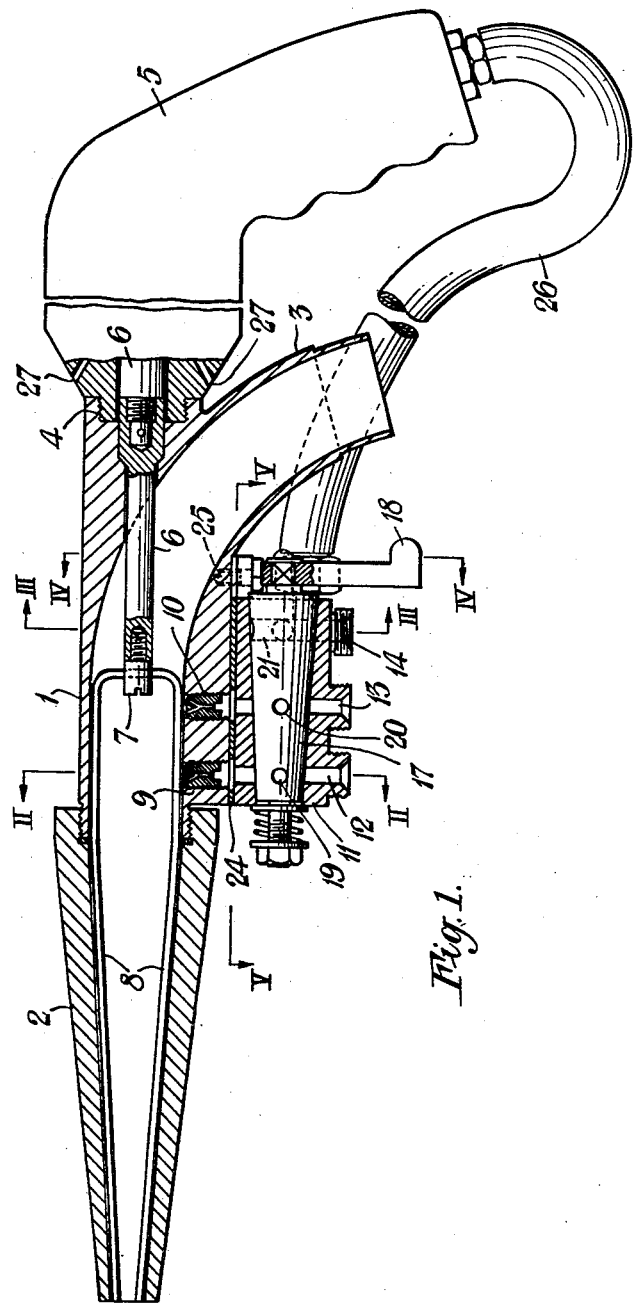

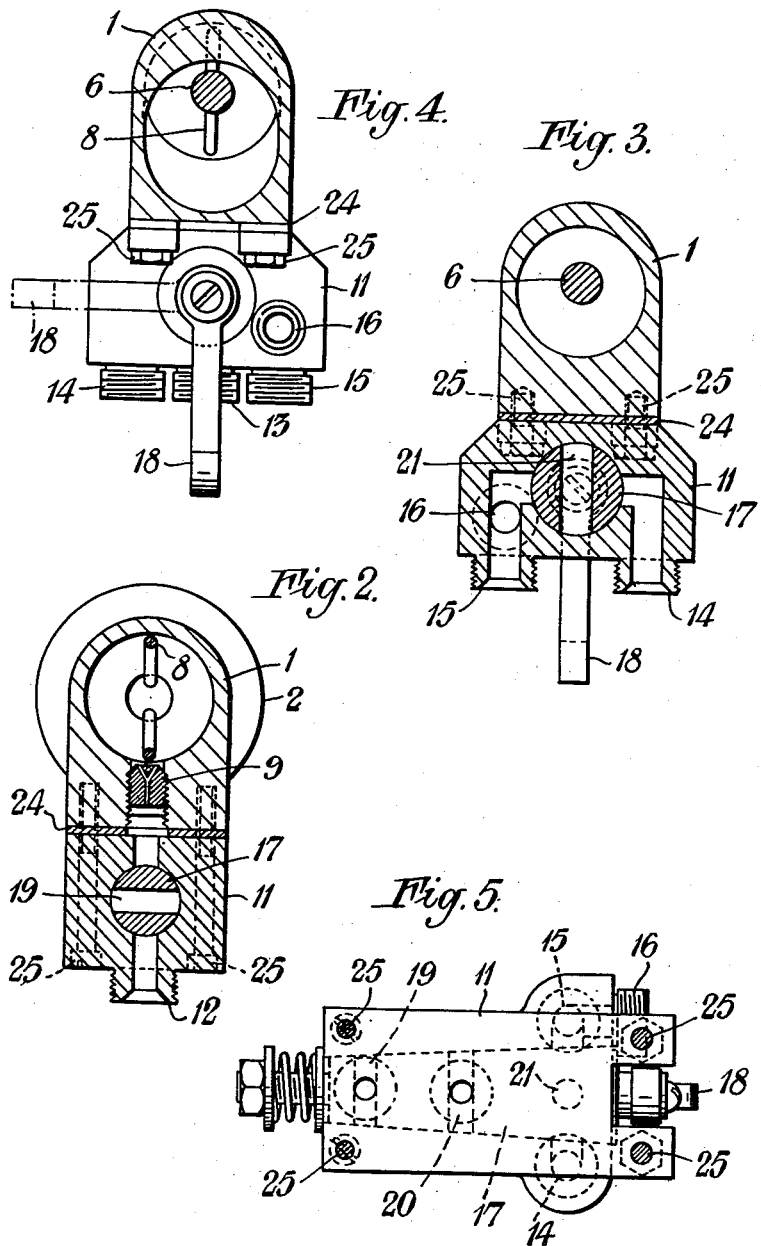

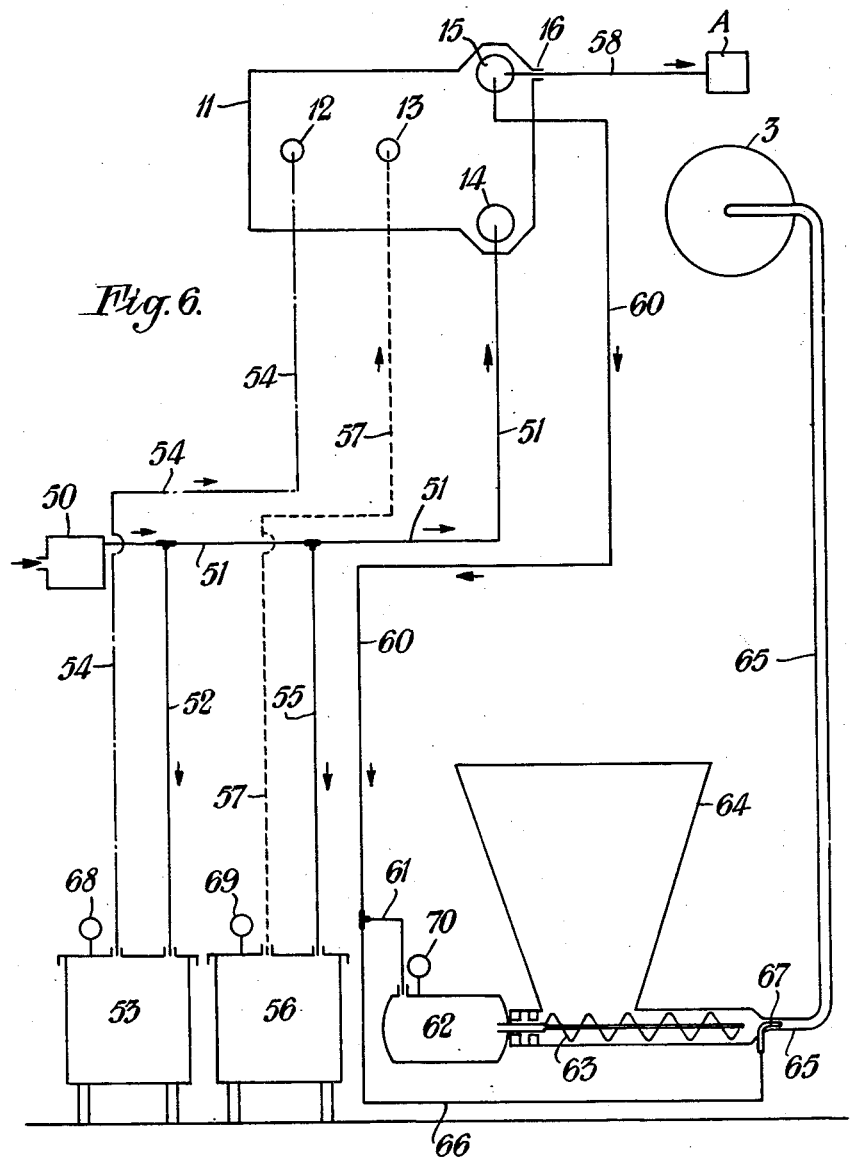

2,705,132

SPRAY GUNS

John Warwick Neville, Norwood Hill, near Horley, England

Application March 13, 1952, Serial No. 276,393

Claims priority, application Great Britain March 14, 1951

3 Claims. (Cl. 259—151)

This invention relates to spray guns for use in spraying cementitious, plastic or other suitable materials on to walls, panels, girders, stanchions and other structural elements and the like, and aims at providing a spray gun which is simple in construction, reliable in operation and in which all the constituents to be sprayed are discharged from the gun as a pre-formed mixture instead of in the form of a plurality of separate jets commingling outside the gun.

To this end, the present invention contemplates a spray gun comprising a mixing chamber in which all the constituents of the mixture to be discharged from the gun, such as for example, air, pulverulent or granular material, water, and if desired a dispersion or solution of a binding agent such as a natural or synthetic resin dispersion—all introduced into the mixing chamber under pressure and in exact proportion to one another—are mixed together, which mixing chamber houses one or more rotating members serving as scrapers to keep the interior wall of the mixing chamber free from accretions and if desired also as an additional mixing device.

The rotating member or members is or are mounted through reduction gearing on a spindle which is driven by an air motor arranged adjacent to the handle of the gun and operated by compressed air. Alternatively any other type of driving motor may be employed. By this means it is possible to supply a plurality of powders and liquids independently of one another to the mixing chamber and thoroughly to mix them in their correct predetermined proportions before ejecting the resultant mixture from the gun.

The main ingredient or ingredients, i. e. pulverulent or granular material or materials, such as a cementitious composition which can either be pre-mixed in a dry condition or separately supplied, are fed in suspension in compressed air to the mixing chamber through a conduit opening longitudinally into said mixing chamber. The same compressed air as supplies the main ingredient or ingredients may also be used for forcing the mixture from the mixing chamber out of the nozzle of the gun; alternatively a separate air ejector may be employed for said latter purpose if desired.

The subsidiary ingredients, e. g. water and solution or dispersion of binding agent may if desired, be fed to the mixing chamber via annuli, through radial openings in said mixing chamber so that said subsidiary ingredients enter the mixing chamber in a direction forming a chord of the inner circumference of said chamber.

The air for effecting the various operations of the gun and for supplying the different ingredients to the mixing chamber thereof may be derived from a single source, such as a static or portable air compressor.

In order to enable the invention to be more readily understood, reference is made to the accompanying drawings which illustrate diagrammatically and purely by way of example, one embodiment thereof, and in which:

Fig. 1 is a longitudinal section, partly in elevation of the spray gun;

Fig. 2 is a cross-section along the line II—II of Fig. 1;

Fig. 3 is a cross-section along the line III—III of Fig. 1;

Fig. 4 is a cross-section along the line IV—IV of Fig. 1;

Fig. 5 is a plan section along the line V—V of Fig. 1; and

Fig. 6 is a flow diagram.

The spray gun illustrated is intended to spray a mixture of cementitious material, rubber latex dispersion (serving as binding agent) and water on to structural components for the purpose of protecting the same. Said gun comprises a metal casing 1 on to which is screwed an elongated nozzle member 2 which together with the casing 1, constitutes a mixing chamber. At its rear end, the casing 1 is formed as an arcuate conduit 3. Secured to the casing 1 at 4 is a handle 5 housing a compressed air motor (not shown) driving a spindle 6 through reduction gearing (not shown). Secured to the spindle 6 by a screw 7 is a scraper member 8 of U-configuration, consisting of silver steel wire and conforming closely to the inner contour of the casing 1 and nozzle 2.

Into the underside of the casing 1 are screwed two jet members 9 and 10 through which liquid is introduced in the form of fine streams, into the interior of the casing 1.

Secured to the underside of the casing 1 by means of screws 25 with an interposed gasket 24 is a valve block 11 having five bores viz. 12, 13, 14, 15 and 16 which are all controlled by a single plug cock 17 controlled by an operating handle 18. The plug cock 17 has bores 19, 20 and 21, the first two viz. 19 and 20 of which lie in the same direction while the bore 21 lies at right angles to the other bores.

26 denotes a flexible conduit connected from aperture 16 to handle 5 and supplying driving air to the air motor (not shown). The exhaust air from the air motor issues through one or more apertures 27.

The operation of the spray gun described with reference to Figs. 1 to 5 will be illustrated by the flow chart shown in Fig. 6.

In the exemplified embodiment, the spray gun is intended to spray a mixture of a self-hardening pulverulent material with an aqueous rubber emulsion and water, to serve as a protection for structural steelwork against corrosion.

In Fig. 6, the reference numeral 50 denotes a source of compressed air.

When the plug cock 17 is in the open position, i. e. with the bores 19, 20 and 21 at right angles to the position shown in Fig. 1, air under pressure from source 50 flows through line 51 into bore 14 of the spray gun described with reference to Figs. 1 to 5. A part of the compressed air flowing through line 51 passes through line 52 and enters a pressure pot 53 containing rubber latex which is forced by the air pressure, through line 45 into the bore 12. Another part of the compressed air flowing through the conduit 51 flows through line 55 and enters a pressure pot 56 containing water and forces said water through a line 57 into the bore 13 of the spray gun. The remaining part of the compressed air passing through bore 14 flows through bores 15 and 16. The compressed air issuing through the bore 16 flows into line 58 and drives the air motor A enclosed in the handle 5 of the gun illustrated in Fig. 1 which motor drives the scraper member 8. Another part of said compressed air from the bore 15 flows through conduit 60 in which it is again divided into two parts, one part, flowing through conduit 61, operating an air motor 62 driving a worm 63 into which pulverulent or granular material is introduced via a hopper 64 and conveyed into a conduit 65 by the ejector action of the remaining part of the compressed air, passing through conduit 66 and entering an ejector nozzle 67. Said granular material introduced into the hopper 64 is thus conveyed in suspension in air into the arcuate conduit 3 of the spray gun.

The relative proportions of the rubber latex water and pulverulent or granular material supplied to the mixing chamber of the gun are controlled by pressure regulator valves 68, 69 and 70 respectively.

From the foregoing description it will be seen that water entering the mixing chamber of the spray gun through bore 13, rubber latex entering said mixing chamber through bore 12 and a suspension in air of pulverulent or granular material entering said mixing chamber through conduit 3 are intimately mixed in said mixing chamber and discharged through the nozzle portion 2 by the pressure primarily of the compressed air entering through conduit 3 while the compressed air motor fed from the common source of compressed air 50 actuates the member 8 to serve to scrape away accretions from the interior of the nozzle 2 and at the same time to promote an intimate mixing of the rubber latex, water and pulverulent or granular material.

If desired a further ejector supplied with air from bore 15 may be incorporated in or adjacent to the mixing chamber of the gun.

It will be clear that although only one main powder conduit and two subsidiary conduits have been described, there may well be more than this number for the liquid and/or solid materials.

By means of the present invention a better mixing of the ingredients, such as sand, cement, plaster, water and solution or dispersion of binding agent, is effected within the mixing chamber and a homogeneous mixture is discharged from the nozzle.

I claim:

1. A spray gun for use in discharging under pressure a mixture of solid and liquid materials, which comprises a mixing chamber terminating at one end in a tapered discharge passage, a handle attached to the other end of said mixing chamber, an inlet to said mixing chamber for each constituent of the mixture to be discharged from the gun, an inlet for compressed gaseous fluid to said mixing chamber, at least one rotating member consisting of a wire of U configuration housed in said mixing chamber and extending along said tapered discharge passage and conforming closely to the inner contour of said mixing chamber including said tapered discharge passage, and a motor carried in said handle and driving said rotating member.

2. A spray gun for use in discharging under pressure a mixture of solid and liquid materials, which comprises a mixing chamber terminating at one end in a tapered discharge passage, a handle attached to the other end of said mixing chamber, an inlet to said mixing chamber for each constituent of the mixture to be discharged from the gun, an inlet for compressed gaseous fluid to said mixing chamber, at least one rotating member consisting of a wire of U configuration housed in said mixing chamber and extending along said tapered discharge passage and conforming closely to the inner contour of said mixing chamber including said tapered discharge passage, and an air motor carried in said handle and driving said rotating member.

3. A spray gun for use in discharging under pressure a mixture of solid and liquid materials, which comprises a main casing, a tapered discharge nozzle terminating in a discharge opening and connected to said main casing and cooperating therewith to form a mixing chamber, an inlet to said mixing chamber for each constituent of the mixture to be discharged from the gun, an inlet for compressed gaseous fluid to said mixing chamber, at least one rotating member housed in said mixing chamber and extending throughout said tapered discharge nozzle to said discharge opening and serving as scraper to keep the interior wall of the mixing chamber and said discharge opening free from accretions, and as a mixing device, and a valve block secured to said main casing having a number of bores corresponding to said inlets to said mixing chamber controlled by a single plug cock.

References Cited in the file of this patent

UNITED STATES PATENTS

| | | |
|---|---|---|
| 998,762 | Faller | July 25, 1911 |
| 1,781,603 | Schori | Nov. 11, 1930 |
| 1,849,945 | Mobley | Mar. 15, 1932 |
| 1,953,091 | Westberg et al. | Apr. 3, 1934 |
| 2,299,565 | Colburn | Oct. 20, 1942 |
| 2,511,474 | Kremer | June 13, 1950 |
| 2,577,664 | Pro | Dec. 4, 1951 |
| 2,580,385 | Hochmuth | Jan. 1, 1952 |
| 2,596,074 | Hawes | May 6, 1952 |